United States Patent [19]
Matsui

[11] Patent Number: 5,537,613
[45] Date of Patent: Jul. 16, 1996

[54] DEVICE AND METHOD FOR DETECTING PILOT SIGNAL FOR TWO-CARRIER SOUND MULTIPLEXING SYSTEM

[75] Inventor: Toshiya Matsui, Tokyo, Japan

[73] Assignee: NEC Corporation, Tokyo, Japan

[21] Appl. No.: 408,263

[22] Filed: Mar. 21, 1995

[30] Foreign Application Priority Data

Mar. 24, 1994 [JP] Japan ..................... 6-053431

[51] Int. Cl.$^6$ ..................................... H04H 5/00
[52] U.S. Cl. .................. 381/4; 331/20; 348/536
[58] Field of Search ........... 370/74, 98; 179/1; 455/45; 381/3, 4, 13; 331/20, 21; 348/484, 485, 536, 738; 358/323

[56] References Cited

U.S. PATENT DOCUMENTS

| | | | |
|---|---|---|---|
| 3,949,173 | 4/1976 | Duval et al. | 370/74 |
| 4,209,664 | 6/1980 | Hochrath | 370/74 |
| 4,502,148 | 2/1985 | Ishida et al. | 381/4 |
| 4,618,996 | 10/1988 | Rafal et al. | 370/74 |

FOREIGN PATENT DOCUMENTS 2105784  4/1990  Japan.

OTHER PUBLICATIONS

Report 795-3, 1978–1990, pp. 205–221 Transmission of Two or More Sound Programmes or Information Channels in Television.

*Primary Examiner*—Benedict V. Safourek
*Assistant Examiner*—Ajit Patel

[57] ABSTRACT

A pilot signal detection circuit receives a supply of a pilot signal produced by frequency-modulation of a predetermined third frequency carrier signal by a first discrimination signal of a first frequency and a second discrimination signal of a second frequency, and makes a discrimination between the first discrimination signal and the second discrimination signal by whether a signal detected is of the first frequency or of the second frequency. The pilot signal detection circuit is constituted by first and second multiplying and filtering stages. The first multiplying and filtering stage includes first and second multipliers and first and second low-pass filters. The first and second multipliers multiply the pilot signal respectively with the first reference signal and the second reference signal, and produce respectively first and second multiplied signals. The first and second low-pass filters carry out a predetermined low-pass filtering in response to a supply of the first and second multiplied signals, and produce respectively first and second filtered signals. By providing these multipliers and the low-pass filters at the input side for pre-processing of signals, the requirement of the linearity of the second multiplying and the filtering stage elements is relaxed.

3 Claims, 3 Drawing Sheets

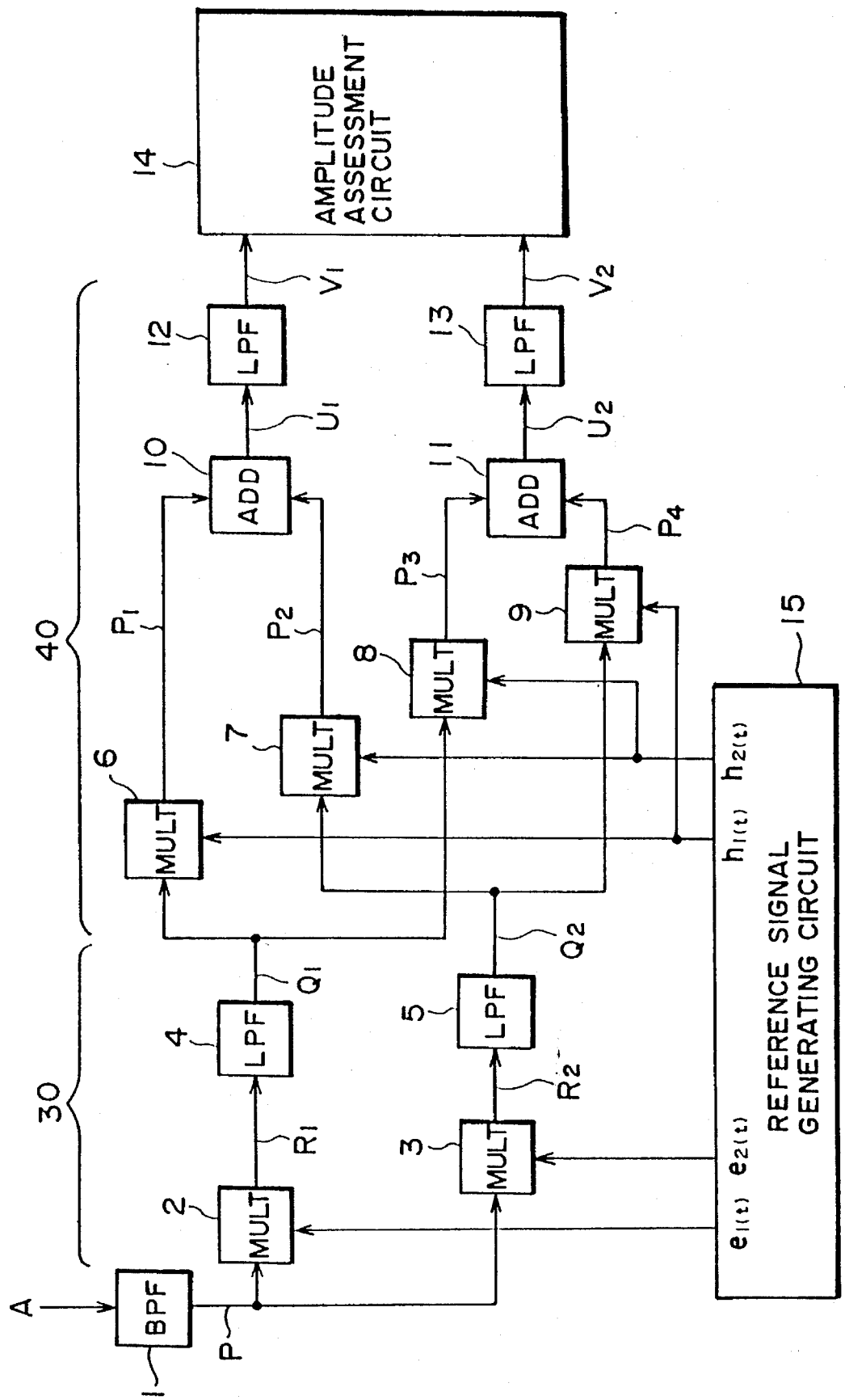

DEVICE AND METHOD FOR DETECTING PILOT SIGNAL FOR TWO-CARRIER SOUND MULTIPLEXING SYSTEM

BACKGROUND OF THE INVENTION (1) Field of the Invention

The present invention relates to a device and a method for detecting a pilot signal, and more particularly to a circuit and a method for detecting a pilot signal for use in a two-carrier sound multiplexing system which is one of sound multiplexing systems for television signals.

(2) Description of the Related Art

The television sound multiplexing system is a system of broadcasting in which a plurality of sound channels are provided for television broadcasting of, for example, bilingual dual sound programs and stereophonic sound programs. One of such systems, a two-carrier sound multiplexing system, which is described in CCIR Document, Report 795-3, 1978-1990, pages 205–221, is a television system used in Europe such as in a PAL television system.

The two-carrier sound multiplexing system is briefly explained with reference to FIG. 1 which diagrammatically show frequency spectrum thereof. The sound signal is transmitted by frequency modulation of two-carriers, that is, an inherent sound carrier of the television system being considered and an additional sound carrier whose frequency is higher than that of the inherent sound carrier. First and second sound IF (intermediate frequency) signals are obtained respectively from the corresponding two sound carriers that are received. The first and second sound IF signals are FM-detected, and a first and a second sound signal respectively corresponding thereto are outputted. In these signals, the first sound signal includes an L+R signal or a main sound signal and the second sound signal includes a 2R signal or a sub-sound signal respectively dependent on whether the type or mode of the sound multiplexing signal is a stereo type or a dual sound type. A pilot signal for discriminating the sound multiplexing signals is also included in the second sound signal. This pilot signal is one in which a signal whose frequency is 3.5 times (hereinafter referred to as "$3.5f_H$") that of a horizontal synchronization signal $f_H$ of a video signal is used as a carrier, and which is AM-modulated at modulation degrees respectively of 50% at a frequency of $f_H/133$ (about 117.5 Hz) in the case of the stereo discrimination signal for stereo broadcasting and at a frequency of $f_H/57$ (about 274.1 Hz) in the case of the dual sound discrimination signal for dual sound broadcasting. The main object of the pilot signal is to detect frequencies respectively of the AM-modulated stereo and dual sound signals and, by doing so, to determine the multiplex sound mode of the broadcast in progress.

FIG. 2 shows, in a block diagram, the most basic first conventional pilot signal detection circuit. This pilot signal detection circuit consists of a band-pass filter (BPF) 1 having a center frequency of $3.5f_H$, which receives a second sound signal A and extracts a pilot signal P; an AM detector 21 which AM-detects the pilot signal P and extracts a modulated signal M; a BPF 22 having a center frequency of 117.5 Hz for a stereo discrimination signal S and a BPF 23 with a center frequency of 274.1 Hz for a dual sound discrimination signal D each of which allows the passage of the modulated signal M; and an amplitude assessment circuit 24 which receives a supply of signals S and D, assesses the amplitude thereof and judges the mode of the broadcasting sound signal being received.

The circuit described above operates as follows: The second sound signal A is supplied to the BPF 1, and the BPF 1 allows the passage of the signal in the vicinity of $3.5f_H$ and extracts only the pilot signal P. This pilot signal P is detected by the AM detector 21 and is supplied as modulated signals to the BPF 22 and the BPF 23. When the reception is of a stereo broadcasting, since the modulated signal M is 117.5 Hz, the signal passes through the BPF 22 of 117.5 Hz and a corresponding stereo discrimination signal S is outputted. Also, when the reception is of a dual sound broadcasting, since the modulated signal M is 274.1 Hz, the signal passes through the BPF 23 and a corresponding dual discrimination signal D is outputted. The amplitude assessment circuit 24 assesses amplitudes of the signals S and D and judges the mode of the broadcast being received by the discrimination signal whose amplitude is larger between them, and appropriately switches the modes of the sound signals that are outputted correspondingly to results of the judgment.

In the first conventional pilot signal detection circuit, the detection sensitivities of the stereo and dual sound discrimination signals S and D are largely dependent on the selectivity characteristics of each of the BPF 22 and the BPF 23 after the AM detection. For enhancing the selectivity characteristics, it is necessary that Q of these BPFs be maintained high. This means that the tolerance of a center frequency deviation is narrower and this is a reason that makes the integration of circuits difficult during the fabrication thereof.

FIG. 3 shows, in a block diagram, a second conventional pilot signal detection circuit which is intended to overcome the above mentioned problem and which is disclosed in Japanese Patent Application Kokai Publication No. Hei 2-105784. This detection circuit consists of a BPF 1 that extracts the same pilot signal P as in the first conventional example; a plurality of multipliers (MULTs) 6, 7, 8 and 9 that respectively multiply the pilot signal P with each of the reference signals $g_{1(t)}$, $g_{2(t)}$, $g_{3(t)}$ and $g_{4(t)}$ and respectively produce signals $P_1$, $P_2$, $P_3$ and $P_4$; and adder (ADD) 10 which adds the signal $P_1$ and $P_2$ and produces a signal $U_1$; an adder 11 which adds the signals $P_3$ and $P_4$ and produces a signal $U_2$; a pair of low-pass filters (LPFs) 12 and 13 that remove high harmonics of each of the signals $U_1$ and $U_2$ and respectively produce signals $V_1$ and $V_2$; an amplitude assessment circuit 14 that receives a supply of the signals $V_1$ and $V_2$, makes amplitude assessment and judges the mode of the broadcasting sound signal being received; and a reference signal generation circuit 16 that produces the above reference signals $g_{1(t)}$, $g_{2(t)}$, $g_{3(t)}$ and $g_{4(t)}$.

The operation of the second conventional pilot signal detection circuit described above is now explained. The pilot signal P extracted by the BPF 1 is supplied to one of input terminals of each of the multipliers 6–9. The reference signals $g_{1(t)}$–$g_{4(t)}$ are supplied to the other of the input terminals of each of the multipliers 6–9. Each of the multipliers 6–9 is generally a combiner and is constituted by a non-linear element such as a diode and a parallel modulator or the like. Each of the reference signals $g_{1(t)}$–$g_{4(t)}$ is a combined signal wherein a signal whose frequency is $3.5f_H$, which is the same as that of the carrier of the pilot signal P, is combined with a signal whose frequency is $f_H/18$, which is the same as that of the stereo discrimination signal, or a signal whose frequency is $f_H/57$, which is same as that of the dual sound discrimination signal. Since the difference between the stereo and the dual sound discrimination signals resides only in the frequencies, the following explanation is made only for the stereo discrimination signal for convenience.

The reference signals $g_{1(t)}$–$g_{4(t)}$ may be expressed using the equations as given hereunder.

$g_{1(t)} = \cos\omega_p t \cdot \cos\omega_s t$ $g_{2(t)} = \sin\omega_p t \cdot \sin\omega_s t$ $g_{3(t)} = \sin\omega_p t \cdot \cos\omega_s t$ $g_{4(t)} = \cos\omega_p t \cdot \sin\omega_s t$ $\omega_p t$: pilot signal carrier frequency ($3.5 f_H$).

$\omega_s t$: stereo discrimination modulation frequency ($f_H/18 = 177.5$ Hz).

Further, the pilot signal P=f(t) which is supplied through the BPF 1 has underdone the AM-modulation, and this may be expressed by the following equation.

$$f(t) = A\{1 + k \cdot \cos(\omega_s t + \phi)\} \cdot \cos(\omega_s t + \theta)$$

wherein $\phi$ represents a modulated signal for the stereo discrimination signal that has been received, and $\theta$ represents a phase difference between the pilot signal carrier and the reference signals $g_{1(t)}$–$g_{4(t)}$.

The pilot signal f(t) is multiplied with the reference signals $g_{1(t)}$–$g_{4(t)}$ respectively at the multipliers 6–9, and the multiplication results $P_1$ and $P_2$ respectively of the multipliers 6 and 7 are supplied to the adder 10 and the multiplied results $P_3$ and $P_4$ respectively of the multipliers 8 and 9 are supplied to the adder 11. The adders 10 and 11 respectively add the signals $P_1$ and $P_2$ and the signals $P_3$ and $P_4$ and the added results $U_1$ and $U_2$ are supplied respectively to the LPFs 12 and 13. The LPFs 12 and 13 respectively remove high harmonics of the signals $U_1$ and $U_2$ and produce signals $V_1$ and $V_2$, and these signals $V_1$ and $V_2$ are supplied to the amplitude assessment circuit 14. This amplitude assessment circuit 14 assesses the amplitudes of the signals $V_1$ and $V_2$ and judges the multiplex sound mode of the broadcast in progress.

The processes explained above may be expressed by the following equations.

First, the operation of the multiplier 6 may be expressed as:

$$\begin{aligned}
f(t) \cdot g_{1(t)} = & \quad (1) \\
& A\{1 + k \cdot \cos(\omega_s t + \phi)\} \cdot \cos(\omega_s t + \theta) \cdot \cos\omega_p t \cdot \cos\omega_s t = \\
& A(1/4) \{\cos(2\omega_p t + \omega_s t + \theta) + \cos(2\omega_p t - \omega_s t + \theta) + \\
& \cos(\omega_s t + \theta) + \cos(\omega_s t - \theta) + \\
& (k/2)\cos(2\omega_s t + 2\omega_s t + \theta + \phi) + \\
& (k/2)\cos(2\omega_p t - 2\omega_s t + \theta + \phi) + \\
& (k/2)\cos(2\omega_p t + \theta + \phi) + (k/2)\cos(2\omega_p t + \theta - \phi) + \\
& (k/2)\cos(2\omega_s t + \theta + \phi) + (k/2)\cos(2\omega_s t + \phi - \theta) + \\
& (k/2)\cos(\theta + \phi) + (k/2)\cos(\phi - \theta)\}
\end{aligned}$$

Similarly, the operations of the multipliers 7–9 may be expressed respectively by the equations (2)–(4).

$$\begin{aligned}
f(t) \cdot g_{2(t)} = & \quad (2) \\
& A(1/4) \{-\cos(2\omega_p t - \omega_s t + \theta) + \cos(2\omega_p t + \omega_s t + \theta) + \\
& \cos(\omega_s t - \theta) - \cos(\omega_s t + \theta) + \\
& (k/2)\cos(2\omega_p t + 2\omega_s t + \theta + \phi) - \\
& (k/2)\cos(2\omega_p t - 2\omega_s t + \theta - \phi) + \\
& (k/2)\cos(2\omega_p t + \theta - \phi) - (k/2)\cos(2\omega_p t + \theta + \phi) + \\
& (k/2)\cos(2\omega_s t + \theta - \phi) - (k/2)\cos(2\omega_s t + \phi + \theta) + \\
& (k/2)\cos(\theta + \phi) - (k/2)\cos(\phi - \theta)\}
\end{aligned}$$

$$\begin{aligned}
f(t) \cdot g_{3(t)} = & \quad (3) \\
& A(1/4) \{\sin(2\omega_p t + \omega_s t + \theta) + \sin(2\omega_p t - \omega_s t + \theta) - \\
& \sin(\omega_s t + \theta) - \sin(\omega_s t - \theta) + \\
& (k/2)\sin(2\omega_p t + 2\omega_s t + \theta + \phi) + \\
& (k/2)\sin(2\omega_p t - 2\omega_s t + \theta + \phi) + \\
& (k/2)\sin(2\omega_p t + \theta + \phi) + (k/2)\sin(2\omega_p t + \theta - \phi) + \\
& (k/2)\sin(2\omega_s t + \theta + \phi) - (k/2)\sin(\theta - 2\omega_s t - \phi) + \\
& (k/2)\sin(\theta + \phi) - (k/2)\sin(\theta - \phi)\}
\end{aligned}$$

$$\begin{aligned}
f(t) \cdot g_{4(t)} = & \quad (4) \\
& A(1/4) \{\sin(2\omega_p t + \omega_s t + \theta) - \sin(2\omega_p t - \omega_s t + \theta) + \\
& \sin(\omega_s t + \theta) + \sin(\omega_s t - \theta) + \\
& (k/2)\sin(2\omega_p t + 2\omega_s t + \theta + \phi) - \\
& (k/2)\sin(2\omega_p t - 2\omega_s t + \theta - \phi) - \\
& (k/2)\sin(2\omega_p t + \theta + \phi) + (k/2)\sin(2\omega_p t + \theta - \phi) + \\
& (k/2)\sin(2\omega_s t + \theta + \phi) + (k/2)\sin(2\omega_s t + \phi - \theta) + \\
& (k/2)\sin(\theta + \phi) + (k/2)\sin(\theta - \phi)\}
\end{aligned}$$

The output signals $V_1 = v_1(t)$ and $V_2 = v_2(t)$ of the LPFs 12 and 13 may be expressed respectively by the following equations (5) and (6).

$$\begin{aligned}
v_1(t) & = \{f(t) \cdot g_{1(t)} + f(t) \cdot g_{2(t)}\} T(s) \quad (5) \\
& = A(1/4)[k/2)\{\cos(\theta + \phi) + \cos(\phi - \theta)\} + \\
& \quad (k/2)\{\cos(\theta + \phi) - \cos(\phi - \theta)\}] \\
& = (k/4)A\cos(\phi + \theta)
\end{aligned}$$

$$\begin{aligned}
v_2(t) & = \{f(t) \cdot g_{3(t)} + f(t) \cdot g_{4(t)}\} T(s) \quad (6) \\
& = A(1/4)[k/2)\{-\sin(\theta + \phi) - \sin(\theta - \phi)\} - \\
& \quad (k/2)\{\sin(\theta + \phi) - \sin(\theta - \phi)\}] \\
& = -(k/4)A\sin(\phi + \theta)
\end{aligned}$$

wherein T(s) represents a transfer function of the LPFs 12 and 13. The amplitude assessment circuit 14 detects the amplitude term A of the discrimination signal from the signals $V_1$ and $V_2$. There are several different approaches for carrying out this detection, but generally this is carried out by squaring each of the signals $V_1$ and $V_2$, adding the squared results, and taking ½ index of the sum of the squares, hence the square root of the sum of the squares.

$$\{v_1(t)^2 + v_2(t)^2\}^{1/2} = (k/4)A \quad (7)$$

If the cut-off frequencies of the LPFs 12 and 13 for the removal of high harmonics are set sufficiently low, it is possible to enhance the equivalent detection characteristics of the discrimination signal. For example, if the cut-off frequency is lowered to about 1 Hz, the frequency 117.5 Hz of the stereo sound discrimination signal may be detected with an accuracy of about ±1Hz.

In the conventional pilot signal detection circuit firstly explained above, since the detection sensitivity of the discrimination signal after the AM-detection is largely dependent on the selectivity characteristics of the BPFs of the stereo and dual sound discrimination signals, respectively, it is required that Q of these BPFs be maintained at a high level for purposes of enhancing the selectivity characteristics. This results in limiting the tolerable deviation in the frequency characteristics and leads to problems in that the production yield is lowered and the adaptability to circuit integration is made difficult in the fabrication of circuits.

The conventional pilot signal detection circuit explained secondly above overcomes the problems just mentioned. However, since it is necessary that the cut-off frequency of the LPFs for the removal of the high harmonics after the operation be set to as small as about several Hz for purposes of enhancing the detection accuracy, there is a slow response characteristic in the transmission signal and this results in a longer detection time.

Also, since the pilot signal is supplied directly to the multipliers, it is necessary that, in consideration of the possibility of noise being mixed in during a weak electric field operation, the linearity and the dynamic range of the multipliers be made sufficiently large in order to ensure the accuracy in detection. This adds to the factors of increasing the costs of design and fabrication.

SUMMARY OF THE INVENTION

The object of the present invention is to overcome the problems existing in the prior art and to provide a pilot signal detection circuit which is used in a two-carrier sound multiplexing system and in which it is possible to ensure excellent pilot signal detection characteristics even under a weak electric field operation.

According to one aspect of the invention, there is provided a pilot signal detection circuit which receives a supply of a pilot signal produced by frequency-modulation of a predetermined third frequency carrier signal by a first discrimination signal of a first frequency and a second discrimination signal of a second frequency, and makes a discrimination between the first discrimination signal and the second discrimination signal by whether a signal detected is of the first frequency or of the second frequency, the pilot detection circuit having a first multiplying and filtering stage and a second multiplying and filtering stage, an amplitude assessment circuit, and a reference signal generating circuit, the first multiplying and filtering stage comprising:

a first and a second multiplying circuit which multiply the pilot signal respectively with a first reference signal that is a first circular function of the third frequency and a second reference signal that is a circular function of the third frequency, and produce respectively a first and a second multiplied signal; and a first and a second low-pass filter which carry out a predetermined low-pass filtering in response to a supply of the first and the second multiplied signal, and produce respectively a first and a second filtered signal which are supplied to the second multiplying and filtering stage.

According to another aspect of the invention, there is also provided a method for detecting a pilot signal in which a supply of a pilot signal produced by frequency-modulation of a predetermined third frequency carrier signal is received by a first discrimination signal of a first frequency and a second discrimination signal of a second frequency, and a discrimination is made between the first discrimination signal and the second discrimination signal by whether a signal detected is the first frequency or the second frequency, the method comprising the steps of:

multiplying the pilot signal respectively with a first reference signal that is a first circular function of the third frequency and a second reference signal that is a circular function of the third frequency, and producing respectively a first and a second multiplied signal;

carrying out a predetermined low-pass filtering in response to a supply of the first and the second multiplied signal, and producing respectively a first and second filtered signal;

multiplying the first filtered signal and a third reference signal that is a first circular function of the first frequency, and producing a third multiplied signal;

multiplying the second filtered signal and a fourth reference signal that is a second circular function of the first frequency, and producing a fourth multiplied signal;

multiplying the first filtered signal and the fourth reference signal, and producing a fifth multiplied signal;

multiplying the second filtered signal and the third reference signal, and producing a sixth multiplied signal;

adding the third and the fourth multiplied signal, and producing a first added signal;

adding the fifth and the sixth multiplied signal, and producing a second added signal;

carrying out a predetermined low-pass filtering in response to a supply of the first and the second added signal, and producing respectively a third and fourth filtered signal; and carrying out amplitude assessment in response to a supply of the third and the fourth filtered signal, and detecting the first and second discrimination signal.

In the pilot signal detection circuit and in the pilot signal detection method according to the present invention, the multiplying circuits and the low-pass filter circuits are provided at the input side for pre-processing of signals. The advantages resulting therefrom are that the equivalent Q of the BPFs for extracting the pilot signal is enhanced, the requirement of the linearity of the multiplying and filtering elements used in the main processing is relaxed, and the problematic factors in the fabrication of circuits can be removed.

Also, since the noise can be effectively removed, it is possible to set the cut-off frequency of the LPFs high and to reduce the time required for the signal detection.

BRIEF DESCRIPTION OF THE DRAWINGS

The above and other objects, features and advantages of the present invention will be apparent from the following description of preferred embodiments of the invention explained with reference to the accompanying drawings, in which:

FIG. 4 is a block diagram showing a pilot signal detection circuit of an embodiment according to the present invention.

PREFERRED EMBODIMENT OF THE INVENTION

Now, a preferred embodiment of the present invention is explained with reference to FIG. 4 of the drawings, in which similar reference symbols or numerals refer to the same or similar elements appearing in FIG. 3.

Figure 1A:
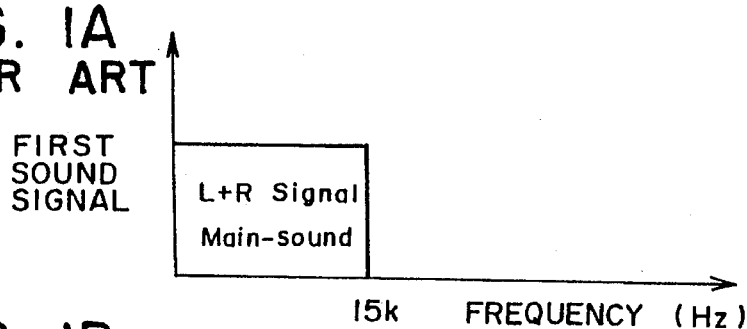
FIG. 1 is a block diagram showing frequency spectrum of a two-carrier sound multiplexing signal, for use in explaining the prior art and also the present invention.
Figure 1B:
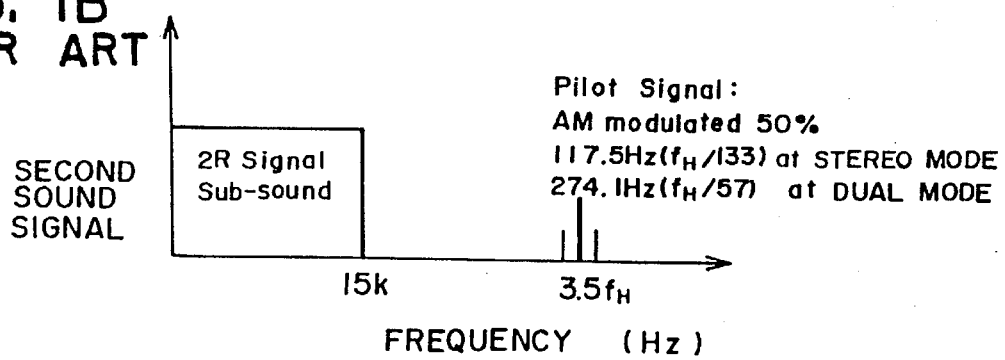
Figure 2:
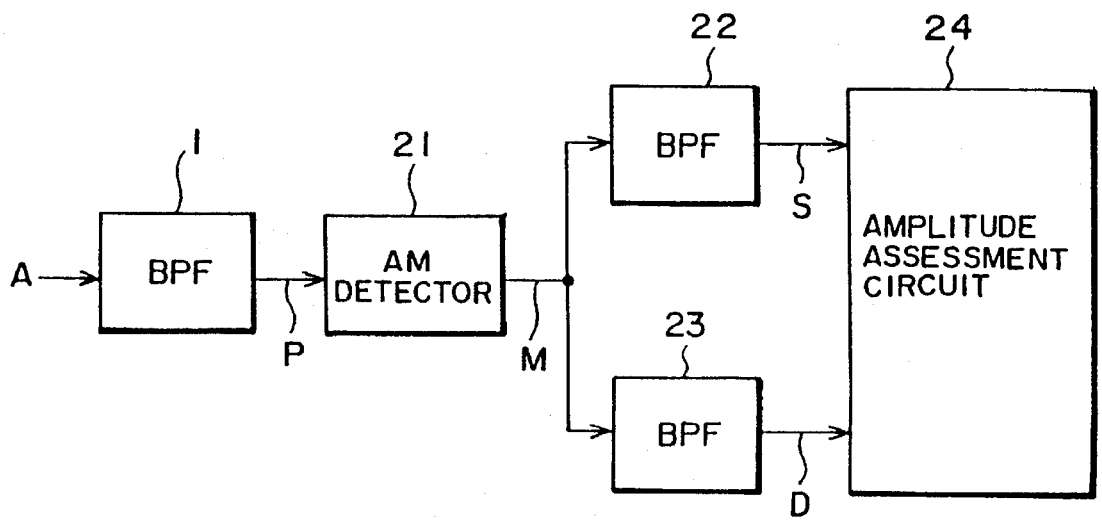
FIG. 2 is a block diagram showing a first conventional pilot signal detection circuit.
Figure 3:
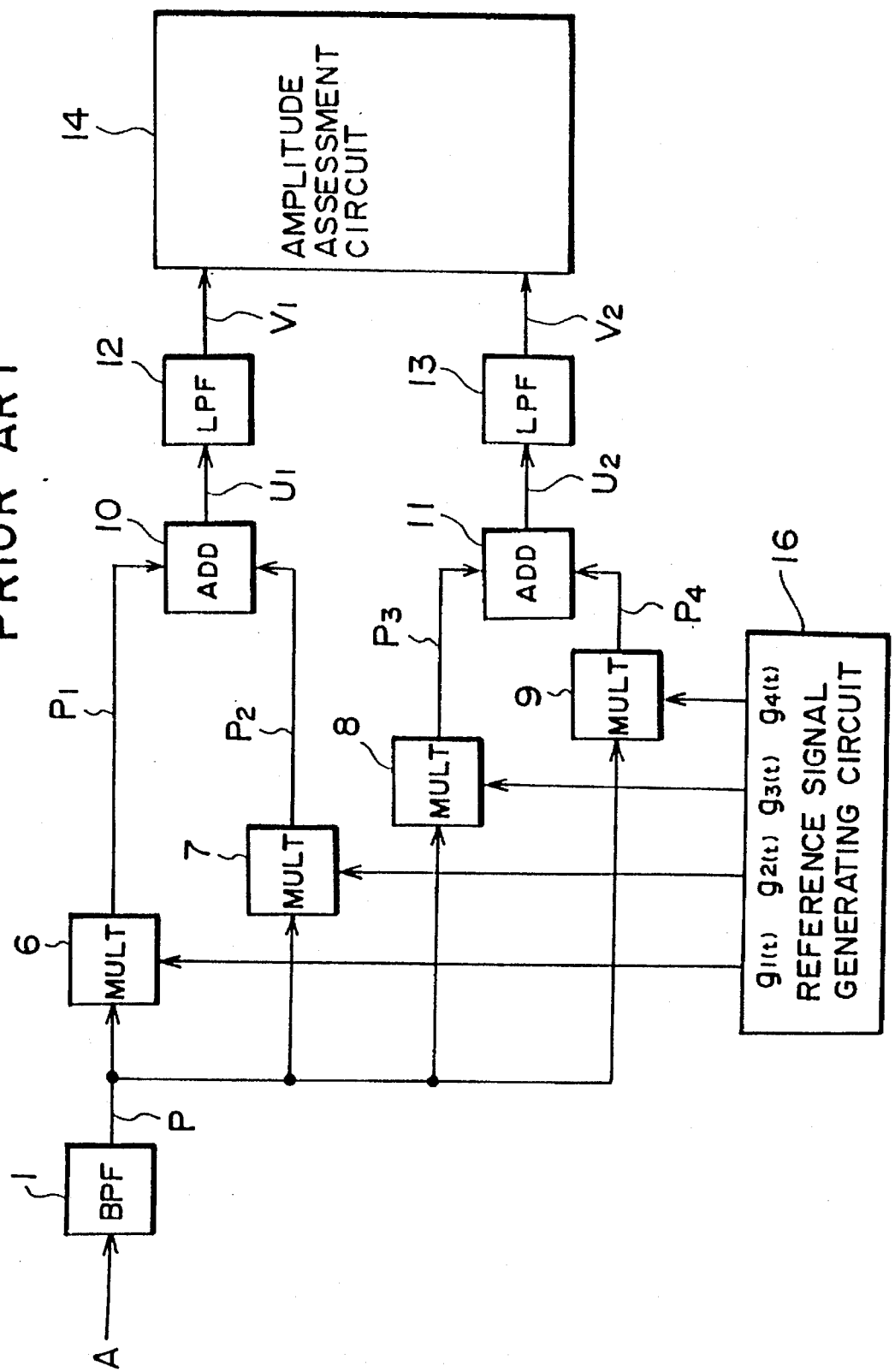
FIG. 3 is a block diagram showing a second conventional pilot signal detection circuit.

As shown in FIG. 4, in the pilot signal detection circuit of this embodiment, in addition to the band-pass filter (BPF) 1, the low-pass filters (LPFs) 12 and 13 and the amplitude assessment circuit 14 which are provided in the conventional circuit shown in FIG. 3, there are two multipliers (MULTs) 2 and 3 each of which multiplies the pilot signal P with each of reference signals $e_{1(t)}$ and $e_{2(t)}$ and which respectively output signals $R_1$ and $R_2$; two low-pass filters (LPFs) 4 and 5 which respectively remove high harmonics of the signals $R_1$ and $R_2$ and output signals $Q_1$ and $Q_2$; four multipliers (MULTs) 6–9, the multipliers 6 and 8 for multiplying the signal $Q_1$ with each of reference signals $h_{1(t)}$ and $h_{2(t)}$ and respectively producing signals $P_1$ and $P_3$, and the multipliers 7 and 9 for multiplying the signal $Q_2$ with each of reference signals $h_{2(t)}$ and $h_{1(t)}$ and respectively producing signals $P_2$ and $P_4$; an adder (ADD) 10 which adds the signals $P_1$ and $P_2$ and produces a signal $U_1$; an adder 11 which adds the signals $P_3$ and $P_4$ and produces a signal $U_2$; and a reference signal generating circuit 15 for generating reference signals $e_{1(t)}$, $e_{2(t)}$, $h_{1(t)}$ and $h_{2(t)}$ instead of the reference generating circuit 16 in the conventional circuit shown in FIG. 3. The multipliers 2, 3 and the low-pass filters 4, 5 constitute a first multiplying and filtering stage 30. The multipliers 6–9, the adders 10, 11 and the low-pass filters 12, 13 constitute a second multiplying and filtering stage 40.

Now, the operation of the circuit of the embodiment is explained with reference to FIG. 4. The pilot signal P extracted by the BPF 1 is supplied to one of the input terminals of each of the multipliers 2 and 3. The reference signals $e_{1(t)}$ and $e_{2(t)}$ are supplied respectively to the other input terminals of each of the multipliers 2 and 3. The reference signals $e_{1(t)}$ and $e_{2(t)}$ are signals with the same frequency as that of the carrier of the pilot signal P, namely, $3.5f_H$, and they may be expressed respectively by the following equations:

$$e_{1(t)} = \cos \omega_p t$$

$$e_{2(t)} = \sin \omega_p t$$

Further, as shown with reference to the prior art, the pilot signal $P=f(t)$ supplied through the BPF 1 may be expressed by the following equations:

$$f(t) = A\{1 + k \cdot \cos(\omega_s t + \phi)\} \cdot \cos(\omega_p t + \theta)$$

wherein $\phi$ represents a modulated signal for the stereo discrimination signal that has been received, and $\theta$ represents a phase difference between the pilot signal carrier and the reference signals $e_{1(t)}, e_{2(t)}$.

The pilot signal $f(t)$ is multiplied with the reference signals $e_{1(t)}, e_{2(t)}$ respectively at the multipliers 2 and 3, and the multiplication results $R_1$ and $R_2$ respectively of the multipliers 2 and 3 are supplied to the low-pass filters (LPFs) 4 and 5, and the signals $Q_1$ and $Q_2$ in which high harmonics have been removed are produced. The output signals $R_1$ and $R_2$ of the multipliers 2 and 3 may be expressed respectively by the following equations (8) and (9):

$$\begin{aligned}R_1 &= f(t) \cdot e_{1(t)} = \\ &A\{1 + \cos(\omega_s t + \phi)\}\cos(\omega_p t + \theta)\cos\omega_p t = \\ &(A/2)\cos(2\omega_p t + \theta) + (A/4)k\{\cos(2\omega_p t + \omega_s t + \theta + \phi) + \\ &\cos(2\omega_p t - \omega_s t + \theta - \phi)\} + \\ &(A/2)\cos\theta + (A/4)k\{\cos(\omega_s t + \theta + \phi) + \cos(2\omega_s t + \phi - \theta)\}\end{aligned} \quad (8)$$

$$\begin{aligned}R_2 &= f(t) \cdot e_{2(t)} = \\ &A\{1 + \cos(\omega_s t + \phi)\}\cos(\omega_p t + \theta)\sin\omega_p t = \\ &(A/2)\sin(2\omega_p t + \theta) + (A/4)k\{\sin(2\omega_p t + \omega_s t + \theta + \phi) + \\ &\sin(2\omega_p t - \omega_s t + \theta - \phi)\} - \\ &(A/2)\sin\theta - (A/4)k\{\sin(\omega_s t - \theta + \phi) - \sin(2\omega_s t + \phi - \theta)\}\end{aligned} \quad (9)$$

The signals $Q_1$ and $Q_2$ that have passed through the LPFs 4 and 5 to which the signals $R_1$ and $R_2$ have been supplied may be expressed respectively by the following equations (10) and (11):

$$\begin{aligned}Q_1 &= f(t) \cdot e_{1(t)} \cdot T_1(s) \\ &= (A/2)\cos\theta + (A/4)k\{\cos(\omega_s t + \theta + \phi) + \\ &\cos(\omega_s t + \phi - \theta)\}\end{aligned} \quad (10)$$

$$\begin{aligned}Q_2 &= f(t) \cdot e_{2(t)} \cdot T_2(s) \\ &= (A/2)\sin\theta - (A/4)k\{\sin(\omega_s t + \theta + \phi) - \\ &\sin(\omega_s t + \phi - \theta)\}\end{aligned} \quad (11)$$

Here, $T_1(s)$ and $T_2(s)$ are transfer functions respectively of the LPFs 4 and 5.

The signal $Q_1$ is supplied to one of the input terminals of each of the multipliers 6 and 8, and the signal $Q_2$ is supplied to one of the input terminals of each of the multipliers 7 and 9. On the other hand, the reference signal $h_{1(t)}$ is supplied to the other of the input terminals of each of the multipliers 6 and 9, and the reference signal $h_{2(t)}$ is supplied to the other of the input terminals of each of the multipliers 7 and 8.

These reference signals $h_{1(t)}$ and $h_{2(t)}$ are signals of the same frequencies as those of the stereo and dual sound discrimination signals, namely, $f_H/18$ or $f_H/57$, and they may be expressed by the following equations (12) and (13). Since the difference between the stereo and the dual sound discrimination signals resides only in the frequencies, the following explanation is made, as is done for the second conventional circuit, only for the stereo discrimination signal for convenience.

$$h_{1(t)} = \cos \omega_s t \quad (12)$$

$$h_{2(t)} = \sin \omega_s t \quad (13)$$

The output signals $P_1$ and $P_2$, respectively from the multipliers 6 and 7 are supplied to the adder 10, and the output signals $P_3$ and $P_4$ respectively from the multipliers 8 and 9 are supplied to the adder 11, whereby the added signals $U_1$ and $U_2$ are respectively produced therefrom. The LPFs 12 and 13 receive the added signals $U_1$ and $U_2$, remove high harmonics and produce signals $V_1$ and $V_2$, and supply these signals $V_1$ and $V_2$ to the amplitude assessment circuit 14, respectively. This amplitude assessment circuit 14 assesses amplitudes of the signals $V_1$ and $V_2$ and judges the multiplex sound mode of the broadcast in progress.

The operation of the multipliers 6–9 may be shown by the equations (14)–(17).

$$\begin{aligned}P_1 &= f(t) \cdot e_{1(t)} \cdot T_1(s) \cdot h_{1(t)} \\ &= [(A/2)\cos\theta + (A/4)k\{\cos(\omega_s t + \theta + \phi) + \\ &\cos(\omega_s t + \phi - \theta)\}]\cos\omega_s t \\ &= (A/2)\cos\theta\cos\omega_s t + \\ &(A/8)k\{\cos(2\omega_s t + \phi + \theta) + \cos(\phi + \theta)\} + \\ &(A/8)k\{\cos(2\omega_s t + \phi - \theta) + \cos(\phi - \theta)\}\end{aligned} \quad (14)$$

$$\begin{aligned}P_2 &= f(t) \cdot e_{2(t)} \cdot T_2(s) \cdot h_{2(t)} \\ &= [-(A/2)\sin\theta + (A/4)k\{\sin(\omega_s t + \theta + \phi) - \\ &\sin(\omega_s t + \phi - \theta)\}]\sin\omega_s t \\ &= -(A/2)\sin\theta\cos\omega_s t + \\ &(A/8)k\{\cos(2\omega_s t + \phi + \theta) - \cos(\phi + \theta)\} + \\ &(A/8)k\{\cos(2\omega_s t + \phi - \theta) - \cos(\phi - \theta)\}\end{aligned} \quad (15)$$

$$\begin{aligned}P_3 &= f(t) \cdot e_{1(t)} \cdot T_1(s) \cdot h_{2(t)} \\ &= [(A/2)\cos\theta + (A/4)k\{\cos(\omega_s t + \theta + \phi) + \\ &\cos(\omega_s t + \phi - \theta)\}]\sin\omega_s t \\ &= (A/2)\cos\theta\sin\omega_s t + \\ &(A/8)k\{\sin(2\omega_s t + \phi + \theta) - \sin(\phi + \theta)\} + \\ &(A/8)k\{\sin(2\omega_s t + \phi + \theta) - \sin(\phi - \theta)\}\end{aligned} \quad (16)$$

$$\begin{aligned}P_4 &= f(t) \cdot e_{2(t)} \cdot T_2(s) \cdot h_{1(t)} \\ &= [-(A/2)\sin\theta + (A/4)k\{\sin(\omega_s t + \theta + \phi) - \\ &\sin(\omega_s t + \phi - \theta)\}]\cos\omega_s t \\ &= -(A/2)\sin\theta\cos\omega_s t - \\ &(A/8)k\{\sin(2\omega_s t + \phi + \theta) + \sin(\phi + \theta)\} + \\ &(A/8)k\{\sin(2\omega_s t + \phi + \theta) + \sin(\phi - \theta)\}\end{aligned} \quad (17)$$

The output signals $V_1 = v_1(t)$ and $V_2 = v_2(t)$ of the LPFs and 13 resulting from the multiplied signals $P_1$–$P_4$ of the multipliers 6–9 being added as explained above and being filtered through the low-pass filters may be expressed respectively by the equations (18) and (19).

$$\begin{aligned}V_1 &= v_1(t) = \{f(t)e_{1(t)}T_1(s)h_{1(t)} + \\ &f(t)e_{2(t)}T_2(s)h_{2(t)}\}T_3(s) \\ &= (k/4)A\cos(\phi - \theta)\end{aligned} \quad (18)$$

$$\begin{aligned}V_2 &= v_2(t) = \{f(t)e_{1(t)}T_1(s)h_{2(t)} + \\ &f(t)e_{2(t)}T_2(s)h_{1(t)}\}T_4(s) \\ &= -(k/4)A\sin(\phi - \theta)\end{aligned} \quad (19)$$

Here, $T_3(s)$ and $T_4(s)$ represent transfer functions of the LPFs 12 and 13, respectively.

The equations (18) and (19) are the same, except the phase term, as the equations (5) and (6) which relate to the prior art, so that the signals $V_1$ and $V_2$ are equivalent to those of the $V_1$ and $V_2$ of the prior art.

The amplitude assessment circuit 14 detects the amplitude term A of the discrimination signals respectively from the signals $V_1$ and $V_2$. As done with respect to the prior art, each of the two signals, $V_1$ and $V_2$, is squared, and the squared results are added, and the square root of the sum of the squares is taken.

$$\{v_1(t)^2 + v_2(t)^2\}^{1/2} = (k/4)A \qquad (20)$$

The equation (20) is also the same as the equation (7), which relates to the detected output in the prior art. Thus, the circuit of the embodiment of the invention leads to about the same results in this respect as those in the second conventional circuit.

In the pilot signal detection circuit of this embodiment according to the invention, the multipliers 2 and 3 and the low-pass filters 4 and 5 are provided at the input side for pre-processing of signals, and this enables reducing the load on the BPF 1 and the multipliers 6–9 as well as the LPFs 12 and 13 for the main processing. That is, by setting the cut-off frequency of the LPFs 4 and 5 to about 300 Hz, it is possible to enhance the equivalent Q of the BPF 1 to about 91 and to make an effective reduction of noise. Also, since the cut-off frequencies of the LPFs 12 and 13 can be set to a level higher than that in the prior art, it is possible to reduce the time required for the signal detection. Furthermore, it is possible to relax the linearity requirement of the multipliers and the filter elements.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A pilot signal detection circuit which receives a supply of a pilot signal produced by frequency-modulation of a predetermined third frequency carrier signal by a first discrimination signal of a first frequency and a second discrimination signal of a second frequency, and makes a discrimination between said first discrimination signal and said second discrimination signal by whether a signal detected is of said first frequency or of said second frequency, said pilot signal detection circuit comprising:

a first and a second multiplying circuit which multiply said pilot signal respectively with a first reference signal that is a first circular function of said third frequency and a second reference signal that is a circular function of said third frequency, and produce respectively a first and a second multiplied signal;

a first and a second low-pass filter which carry out a predetermined low-pass filtering in response to a supply of said first and said second multiplied signal, and produce respectively a first and second filtered signal;

a third multiplying circuit which multiplies said first filtered signal and a third reference signal that is a first circular function of said first frequency, and produces a third multiplied signal;

a fourth multiplying circuit which multiplies said second filtered signal and a fourth reference signal that is a second circular function of said first frequency, and produces a fourth multiplied signal;

a fifth multiplying circuit which multiplies said first filtered signal and said fourth reference signal, and produces a fifth multiplied signal;

a sixth multiplying circuit which multiplies said second filtered signal and said third reference signal, and produces a sixth multiplied signal;

a first adding circuit which adds said third and said fourth multiplied signal, and produces a first added signal;

a second adding circuit which adds said fifth and said sixth multiplied signal, and produces a second added signal;

a third and a fourth low-pass filter which carry out a predetermined low-pass filtering in response to a supply of said first and said second added signal, and produce respectively a third and fourth filtered signal;

an amplitude assessment circuit which carries out amplitude assessment in response to a supply of said third and fourth filtered signals and detects said first and second discrimination signals; and a reference signal generating circuit which produces said first to fourth reference signals.

2. A pilot signal detection circuit according to claim 1, in which said amplitude assessment circuit is configured so as to carry out the amplitude assessment by squaring each of said third and said fourth filtered signal, adding the squared results, and taking the square root of the sum of the squares.

3. A method for detecting a pilot signal in which a supply of a pilot signal produced by frequency-modulation of a predetermined third frequency carrier signal is received by a first discrimination signal of a first frequency and a second discrimination signal of a second frequency, and a discrimination is made between said first discrimination signal and said second discrimination signal by whether a signal detected is said first frequency or said second frequency, said method comprising the steps of:

multiplying said pilot signal respectively with a first reference signal that is a first circular function of said third frequency and a second reference signal that is a second circular function of said third frequency, and producing respectively a first and a second multiplied signal;

carrying out a predetermined low-pass filtering in response to a supply of said first and said second multiplied signal, and producing respectively a first and second filtered signal;

multiplying said first filtered signal and a third reference signal that is a first circular function of said first frequency, and producing a third multiplied signal;

multiplying said second filtered signal and a fourth reference signal that is a second circular function of said first frequency, and producing a fourth multiplied signal;

multiplying said first filtered signal and said fourth reference signal, and producing a fifth multiplied signal;

multiplying said second filtered signal and said third reference signal, and producing a sixth multiplied signal;

adding said third and said fourth multiplied signal, and producing a first added signal;

adding said fifth and said sixth multiplied signal, and producing a second added signal;

carrying out a predetermined low-pass filtering in response to a supply of said first and said second added signal, and producing respectively a third and fourth filtered signal; and carrying out amplitude assessment in response to a supply of said third and said fourth filtered signal, and detecting said first and second discrimination signals.

* * * * *